United States Patent
Hofer et al.

(10) Patent No.: US 9,530,404 B2
(45) Date of Patent: Dec. 27, 2016

(54) SYSTEM AND METHOD OF AUTOMATIC SPEECH RECOGNITION USING ON-THE-FLY WORD LATTICE GENERATION WITH WORD HISTORIES

(71) Applicant: Intel Corporation, Santa Clara, CA (US)

(72) Inventors: Joachim Hofer, Munich (DE); Georg Stemmer, München (DE)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/506,844

(22) Filed: Oct. 6, 2014

(65) Prior Publication Data

US 2016/0098986 A1    Apr. 7, 2016

(51) Int. Cl.
*G06F 17/27* (2006.01)
*G10L 15/08* (2006.01)

(52) U.S. Cl.
CPC ................... *G10L 15/083* (2013.01)

(58) Field of Classification Search
CPC ........ G10L 15/24; G10L 15/083; G10L 15/00; G10L 15/02; G10L 15/063; G10L 15/193; G10L 15/34; G10L 15/183; G10L 15/19; G10L 15/32; G10L 15/187; G06K 9/6885; G06K 9/6297; G06K 9/726
USPC .................... 704/9, 243–251, 254–256, 270, 704/230–231, 275
See application file for complete search history.

(56) References Cited

U.S. PATENT DOCUMENTS

| | | | |
|---|---|---|---|
| 5,870,706 A | 2/1999 | Alshawi | |
| 7,257,533 B2 | 8/2007 | Charlesworth et al. | |
| 7,725,319 B2 | 5/2010 | Aronowitz | |
| 8,738,360 B2 * | 5/2014 | Bonnet | G06F 17/271 704/1 |
| 8,832,589 B2 * | 9/2014 | Zhai | G06F 3/0237 345/173 |
| 9,075,792 B2 * | 7/2015 | Dai | G06F 17/2755 |
| 9,134,906 B2 * | 9/2015 | Zhai | G06F 3/04886 |
| 2004/0143436 A1 | 7/2004 | Huang et al. | |
| 2009/0306964 A1 | 12/2009 | Bonnet et al. | |
| 2014/0149119 A1 * | 5/2014 | Sak | G06F 17/2775 704/260 |
| 2014/0236575 A1 | 8/2014 | Tur et al. | |
| 2014/0280210 A1 | 9/2014 | Ritchie et al. | |
| 2015/0269933 A1 * | 9/2015 | Yu | G10L 15/16 704/232 |

FOREIGN PATENT DOCUMENTS

| | | |
|---|---|---|
| TW | 200413961 | 8/2004 |
| WO | 2012-076895 A1 | 6/2012 |

OTHER PUBLICATIONS

Ljolje et al., "Efficient General Lattice Generation and Rescoring," Conference: Sixth European Conference on Speech Communication and Technology, Eurospeech 1999, Budapest, Hungary, Sep. 5-9, 1999, 4 pages.

(Continued)

*Primary Examiner* — Marivelisse Santiago Cordero
*Assistant Examiner* — Stephen Brinich
(74) *Attorney, Agent, or Firm* — Green, Howard & Mughal LLP

(57) ABSTRACT

A systems, article, and method of automatic speech recognition using on-the-fly word lattice generation with word histories.

25 Claims, 12 Drawing Sheets

(56) References Cited

OTHER PUBLICATIONS

Aubert, et al., "Optimization of Weighted Finite State Transducer for Speech Recognition," IEEE Transactions on Computers, vol. 62, No. 8, Aug. 2013, 9 pages.

Chong, et al., "Scalable Parallelization of Automatic Speech Recognition," book chapter, Scaling Up Machine Learning, 2011, 30 pages, Cambridge University Press.

Moore, et al., "Juicer: A Weighted Finite-State Transducer speech decoder," 3rd Joint Workshop on Multimodal Interaction and Related Machine LEarning Algorithms MLMI'06, 2006, 12 pages.

You et al., "Parallel Scalability in Speech Recognition," IEEE Signal Processing Magazine, Nov. 2009, pp. 124-135.

Povey, et al., "Generating Exact Lattices in the WFST Framewoerk," IEEE International Conference on Acoustics, Speech and Signal Processing (ICASSP), pp. 4213-4216, Mar. 25-30, 2012.

Hori, et al., "Efficient WFST-Based One-Pass Decoding With On-The-Fly Hypothesis Rescoring in Extremely Large Vocabulary Continuous Speech Recognition," IEEE Transactions on Audio, Speech, and Language Processing, vol. 15. No. 4, pp. 1352-1365, May 2007.

Rybach, et al. "Lexical Prefix Tree and WFST: A Comparison of Two Dynamic Search Concepts for LVCSR," IEEE Transactions on Audio, Speech, and Language Processing, vol. 21, No. 6, pp. 1295-1307, Feb. 25, 2013.

Sak, et al., "On-the-fly Lattice Rescoring for Real Time Automatic Speech Recognition," Eleventh Annual Conference of the International Speech Communication Association (Interspeech), 4 pages, 2010.

International Search Report and Written Opinion for PCT/US2015/049174, mailed Dec. 9, 2015, 10 pages.

Ortmanns, et al., "A word graph algorithm for large vocabulary continuous speech recognition," Computer Speech and Language (1997) 11, 43-72.

Search Report for Taiwan Patent Application No. 104128797, issued on Aug. 29, 2016.

\* cited by examiner

```
PROPAGATE A TOKEN THROUGH A WEIGHTED FINITE STATE
TRANSDUCER (WFST) HAVING ARCS AND WORD OR WORD
IDENTIFIERS AS OUTPUT LABELS OF THE WFST, AND COMPRISING
PLACING WORD SEQUENCES INTO A WORD LATTICE
202
```

```
GENERATE A WORD HISTORY DESIGNATION FOR INDIVIDUAL
TOKENS WHEN A WORD IS ESTABLISHED AT A TOKEN
PROPAGATING ALONG ONE OF THE ARCS WITH AN OUTPUT
SYMBOL, WHEREIN THE WORD HISTORY DESIGNATION INDICATES A
WORD SEQUENCE
204
```

```
DETERMINE WHETHER OR NOT TWO OR MORE TOKENS SHOULD
BE COMBINED TO FORM A SINGLE TOKEN IN A STATE OF THE
WFST BY USING, AT LEAST IN PART, THE WORD HISTORY
DESIGNATIONS
206
```

KEY
○ WFST State
● WFST State with active token
◎ WFST Final state
▭ Word Lattice node
→ WFST Arc
--→ Word Lattice edge Word output during token update Word lattice update due to token recombination

SYSTEM AND METHOD OF AUTOMATIC SPEECH RECOGNITION USING ON-THE-FLY WORD LATTICE GENERATION WITH WORD HISTORIES

BACKGROUND

Speech recognition systems, or automatic speech recognizers (ASRs), have become increasingly important as more and more computer-based devices use speech recognition to receive commands from a user in order to perform some action as well as to convert speech into text for dictation applications or even hold conversations with a user where information is exchanged in one or both directions. Such systems may be speaker-dependent, where the system is trained by having the user repeat words, or speaker-independent where anyone may provide immediately recognized words. Some systems also may be configured to understand a fixed set of single word commands, such as for operating a mobile phone that understands the terms call or answer, or for simple data entry phone calls for example. Other ASRs use a natural language understanding (NLU) module that understands grammar and definitions of words to recognize a word from the context of the utterance (the words or sentences that were spoken) for more complex conversations or exchanges of information. For integrating an Automatic Speech Recognizer (ASR) with a Natural Language Understanding (NLU) module in a conversational system, confidence measures and/or alternative results are often required. One popular way to generate this data is to create a word lattice, i.e., a network of likely word hypotheses. The generation of word lattices, however, may slow down the speech recognition process resulting in a relatively inefficient process.

Also, word lattices are often built in a second step from state or phone lattices which were generated on the fly during speech decoding. Since state and phone lattices can become relatively large, and usually significantly larger than word lattices, this approach requires a large amount of RAM. A more efficient system is desirable.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of a speech recognition process to generate a word lattice using word histories;

DETAILED DESCRIPTION

Figure 1:
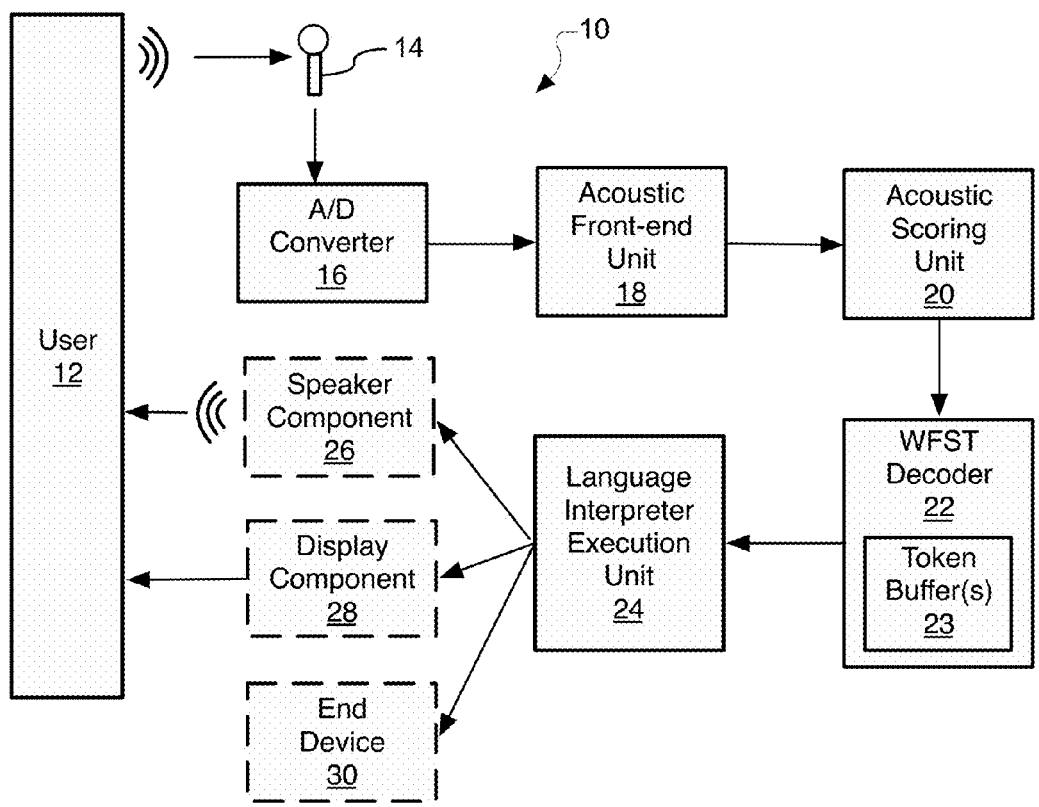
FIG. 1 is a schematic diagram showing an automatic speech recognition system.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, mobile devices such as smart phones, video game panels or consoles, television set top boxes, on-board vehicle systems, dictation machines, security and environment control systems for buildings, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of automatic speech recognition using on-the-fly word lattice generation with word histories.

As mentioned above, for integrating an Automatic Speech Recognizer (ASR) with a Natural Language Understanding (NLU) module in a conversational system confidence measures and/or alternative results are often required. One popular way to generate this data is to create a word lattice, i.e. a network of likely word hypotheses. Word lattices are usually generated in a second step after the utterance was spoken from a dynamically generated state or phone lattice. As state and phone lattices can become quite large and are always significantly larger than word lattices, this approach requires a lot of RAM. See, for example, "Efficient General Lattice Generation and Rescoring" (Ljolje et al., Proc. Eurospeech 99) for a method to generate a word lattice using a phoneme lattice, and which is fully incorporated herein.

The ASR system and method described herein addresses the problem to generate word lattices efficiently with less memory and without slowing down the speech recognition process compared to first-best decoding. To accomplish this, a speech recognition decoder creates a word lattice in a single pass during decoding without needing to build an intermediate state or phone lattice or word boundary lists. Instead, the word lattice is generated in a single pass during decoding. The approach has no significant negative impact on the decoding speed. The decoder used to perform the disclosed methods may be a weighted finite-state transducer (WFST) based speech decoder, e.g., one as described in "Juicer: A Weighted Finite-State Transducer Speech Decoder" (Moore et al., 3$^{rd}$ Joint Workshop on Multimodal Interaction and Related Machine Learning Algorithms MLMI'06). The generation of the word lattice is independent of the approach used for WFST decoding, e.g. the decoder may either use static or dynamic WFST composition.

A hypothetical word sequence or word lattice may be formed by the weighted finite state transducer (WFST) decoder that utilizes acoustic scores (scores of context dependent phonemes based on GMMs, DNNs or other acoustic models in an utterance being analyzed) and forms utterance hypotheses by utilizing a token passing algorithm. A single token represents one hypothesis of a spoken utterance including a word history designation that represents the words that were spoken according to that hypothesis. During decoding, several tokens are placed in the states of the WFST, each of them representing a different possible utterance that may have been spoken up to that point in time. At the beginning of decoding, a single token is placed in the start state of the WFST. Additionally, an empty intermediate word lattice is created with the token referencing the start node of the lattice. During discrete points in time (so called frames), each token is transmitted along the arcs of the WFST. Thus, the token is said to propagate along the arcs of the WFST. If a WFST state has more than one outgoing arc, the token is duplicated, creating one token for each destination state. If the token is passed along an arc in the WFST that has a non-epsilon output symbol (i.e. the output is not empty, so that there is a word hypothesis attached to the arc), a new node for that output symbol is created in the intermediate word lattice and is attached to the node referenced by the token. The token then references the newly created node. In a single-best decoding environment, it is sufficient to only consider the best token in each state of the WFST. If more than one token is propagated into the same state, all but one of those tokens are removed from the active search space. This process is called recombination, as several different utterance hypotheses are recombined into a single one. If a token is dropped due to recombination, the corresponding node in the intermediate word lattice is also deleted if it is not referenced by any other token or any other node in the lattice. If more than one utterance hypothesis shall be considered at the end of decoding, as is the case for generating a word lattice, this approach may drop significant information. If recombination takes place for tokens with different word histories (i.e. the tokens represent different spoken word sequences), then some utterance hypotheses are dropped during recombination and may not be present in the final decoding result, reducing the benefit of a word lattice.

In order to resolve the problems of recombination, other approaches often use phone or state lattices during decoding in order to be able to create a word lattice, see e.g. "Efficient General Lattice Generation and Rescoring" (Ljolje et al., Proc. Eurospeech 99). The approach described herein eliminates the need of a phone (or state) lattice, by limiting the circumstances when the recombination of tokens is possible. This is accomplished by encoding the word history of each token in a word designation, such as a hash value, that is stored in conjunction with each token. During recombination, the word history designations of competing tokens are compared to determine whether a recombination is warranted. Only if the designations are equal, then a recombination takes place. If the designations, and in turn the word histories, differ, both tokens are kept in the same state of the WFST, and no recombination takes place. A word history is a hypothetical whole or part of an utterance established up to the current point in time of decoding. The word history of a token is made up of the output labels of WFST arcs which the token was passed along during decoding. The word history and word sequence as used herein refers to specific words placed in a specific order. Thus, "I am here" is not the same word sequence, and word history, as "Here I am". Tokens with the same word history designation or hash value represent the same complete or partial utterance including the same word, and/or sequence of words. The word history hashes are stored in tokens to be able to determine whether two tokens have the same word history by using a single integer comparison by one example. Tokens with the same word history value may be recombined, and one of the tokens is dropped. Tokens with different word histories representing different hypothetical word sequences at the same state are both maintained in the active search space.

In order to limit the number of active tokens, tokens placed in the same state but with different word histories still occasionally may be recombined resulting in an update of the intermediate word lattice. This update of the word lattice may take significantly more computation time than a regular token recombination. Thus, this update is not performed for every token recombination but is rather performed either on regular time intervals (e.g. every 100 ms) or when the demand for such an update arises (e.g. because the active search space grows too large).

These approaches are explained in greater detail below, and are provided to avoid losing lattice information during token recombination without much computational overhead thereby significantly reducing the RAM used compared to a system that uses a first stage with phone lattices and a second stage with word lattices.

Referring to FIG. 1, an automatic speech recognition system 10, such as a speech enabled human machine interface (HMI), may have an audio capture or receiving device 14, such as a microphone for example, to receive sound waves from a user 12, and that converts the waves into a raw electrical acoustical signal that may be recorded in a memory. The system 10 may have an analog/digital (A/D) converter 16 to provide a digital acoustic signal to an acoustic front-end unit 18. The acoustic front-end unit 18 may perform pre-processing which may include noise cancelling, pre-emphasis filtration to flatten the signal, and/or voice activation detection (VAD) to identify the endpoints of utterances as well as linear prediction, mel-cepstrum, and/or additives such as energy measures, and delta and acceleration coefficients, and other processing operations such as weight functions, feature vector stacking and transformations, dimensionality reduction and normalization. The front-end unit 18 also may divide the acoustic signal into frames, by 10 ms frames by one example, and extracts acoustic features or feature vectors from the acoustic signal using fourier transforms and so forth to identify phonemes provided in the signal. An acoustic scoring unit 20 then determines a probability score for the context dependent phonemes that are to be identified.

A weighted finite state transducer (WFST) unit or decoder 22 uses the acoustic scores to identify utterance hypotheses and compute their scores. Additionally, the WFST decoder 22 dynamically creates a word lattice in a single pass during decoding that provides confidence measures and/or alternative results. The WFST decoder 22 uses calculations that may be represented as a network of arcs and states that is referred to as a WFST. The WFST may be used to generate word history designations, and by one example by using hash functions. The word history designations are used to control the token combinations (or recombinations) and limit the number of active tokens also as described in detail below. The WFST may be a deterministic or a non-deterministic finite state transducer that may or may not contain epsilon arcs. The WFST may contain one or more final states that may or may not have individual weights. The WFST may contain one or more initial states. The WFST may be statically or dynamically composed from a lexicon WFST (L) and a language model or a grammar WFST (G). Alternatively, it may consist of the lexicon WFST (L) which may or may not be implemented as a tree without an additional grammar or language model. The WFST may or may not be statically or dynamically composed with a context sensitivity WFST (C). The WFST may or may not be statically or dynamically composed with an HMM WFST (H) that may have HMM transitions, HMM state IDs, GMM densities or DNN output state IDs as input symbols. The WFST may or may not be determinized, minimized, weight or label pushed or otherwise transformed (e.g. by sorting the arcs by weight, input or output symbol) in any order before being used for decoding. The WFST decoder 22 uses known specific rules, construction, operation, and properties for single-best speech decoding, and the details of these that are not relevant here are not explained further in order to provide a clear description of the arrangement of the new features described herein.

The output word lattices are made available to a language interpreter and execution unit (or interpretation engine) 24 to determine the user intent. This intent determination or spoken utterance classification may be based on decision trees, form filling algorithms or statistical classification (e.g. using SVNs or DNNs).

Once the user intent is determined for an utterance, the interpretation engine 24 also may output a response or initiate an action. The response may be in audio form through a speaker component 26, or in visual form as text on a display component 28 for example. Otherwise, an action may be initiated to control another end device 30 (whether or not considered as part of, or within, the same device as the speech recognition system 10). For example, a user may state "call home" to activate a phone call on a telephonic device, the user may start a vehicle by stating words into a vehicle fob, or a voice mode on a smart phone may perform certain tasks on the smart phone. The end device 30 may simply be software instead of a physical device or hardware or any combination thereof, and is not particularly limited to anything except to have the ability to understand a command or request resulting from a speech recognition determination and to perform or initiate an action in light of that command or request.

Referring to FIG. 2, an example process 200 for a computer-implemented method of speech recognition is provided. In the illustrated implementation, process 200 may include one or more operations, functions or actions as illustrated by one or more of operations 202 to 206 numbered evenly. By way of non-limiting example, process 200 may be described herein with reference to example speech recognition devices described herein with any of FIGS. 1 and 4-13, and where relevant.

Process 200 may include "propagate tokens through a weighted finite state transducer (WFST) having arcs and words or word identifiers as output labels of the WFST, and comprising placing word sequences into a word lattice" 202. In other words, this operation is directed to the performance of speech decoding with a token passing algorithm utilizing a weighted finite state transducer (WFST) and to generate the word lattice.

Process 200 also may include "generate a word history designation for individual tokens when a word is established at a token propagating along one of the arcs with an output symbol, wherein the word history designation indicates a word sequence" 204. This includes generating the word history designation when an arc with a non-epsilon output label is passed by the token. As explained below, the designation may be an integer or other alpha-numeric value that is a hash value created by using a hash function by one example. Also, each designation indicates a sequence of certain words in a certain order, and by one example the designation is associated with values that are assigned to words (I=4, am=5, and so forth).

Process 200 also may include "determine whether or not two or more tokens should be combined to form a single token in a state of the WFST by using, at least in part, the word history designations" 206. As explained in detail below, a combination, also referred to as a recombination, may be performed when the word history designations of two tokens are the same, indicating they both have the same word history. The treatment of the tokens during a recombination, an uncombined but shared state, and a dynamic word lattice update are described below.

Figure 3A:
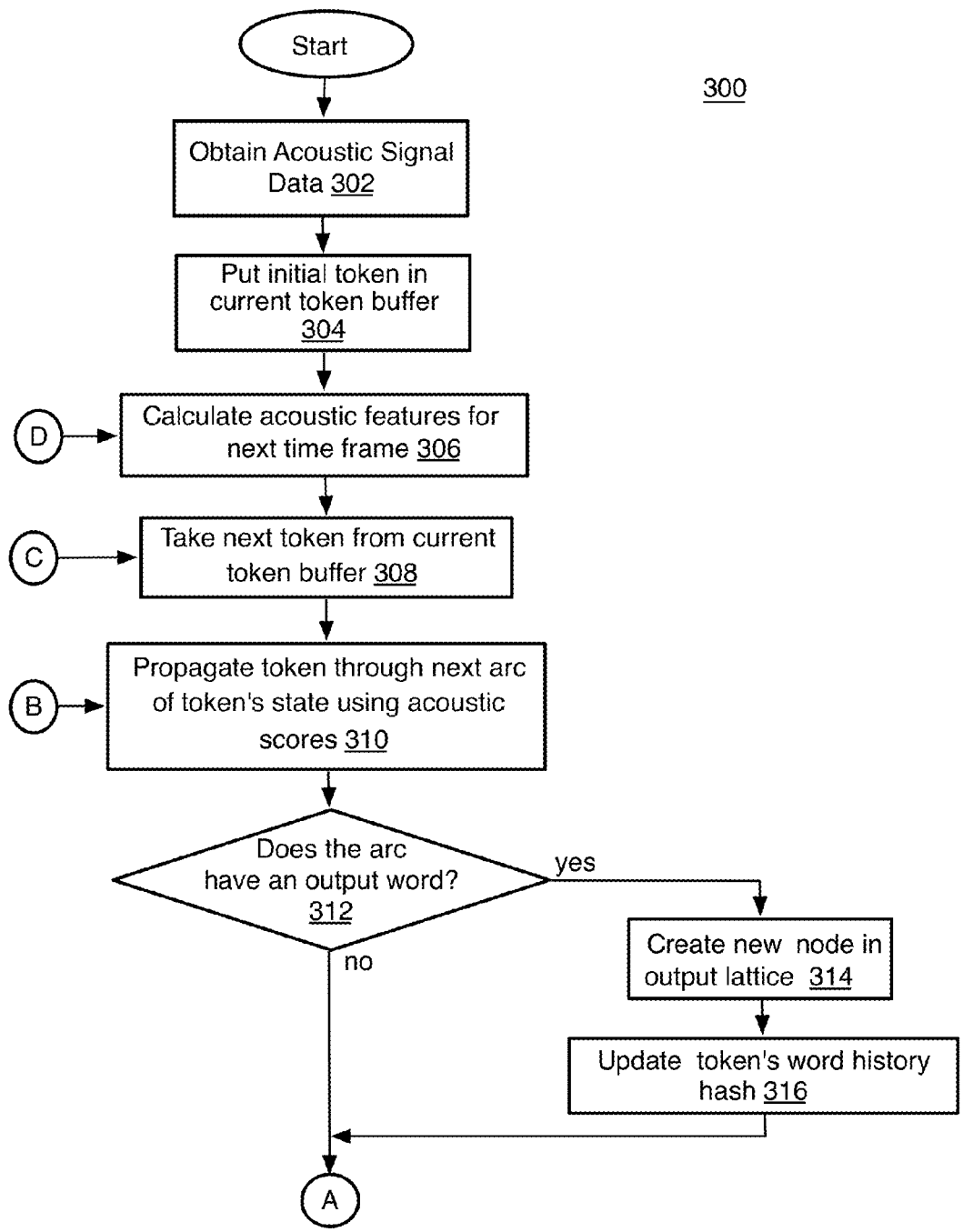
FIGS. 3A-3B is a detailed flow chart of a speech recognition process to generate a word lattice using word histories.
Figure 3B:
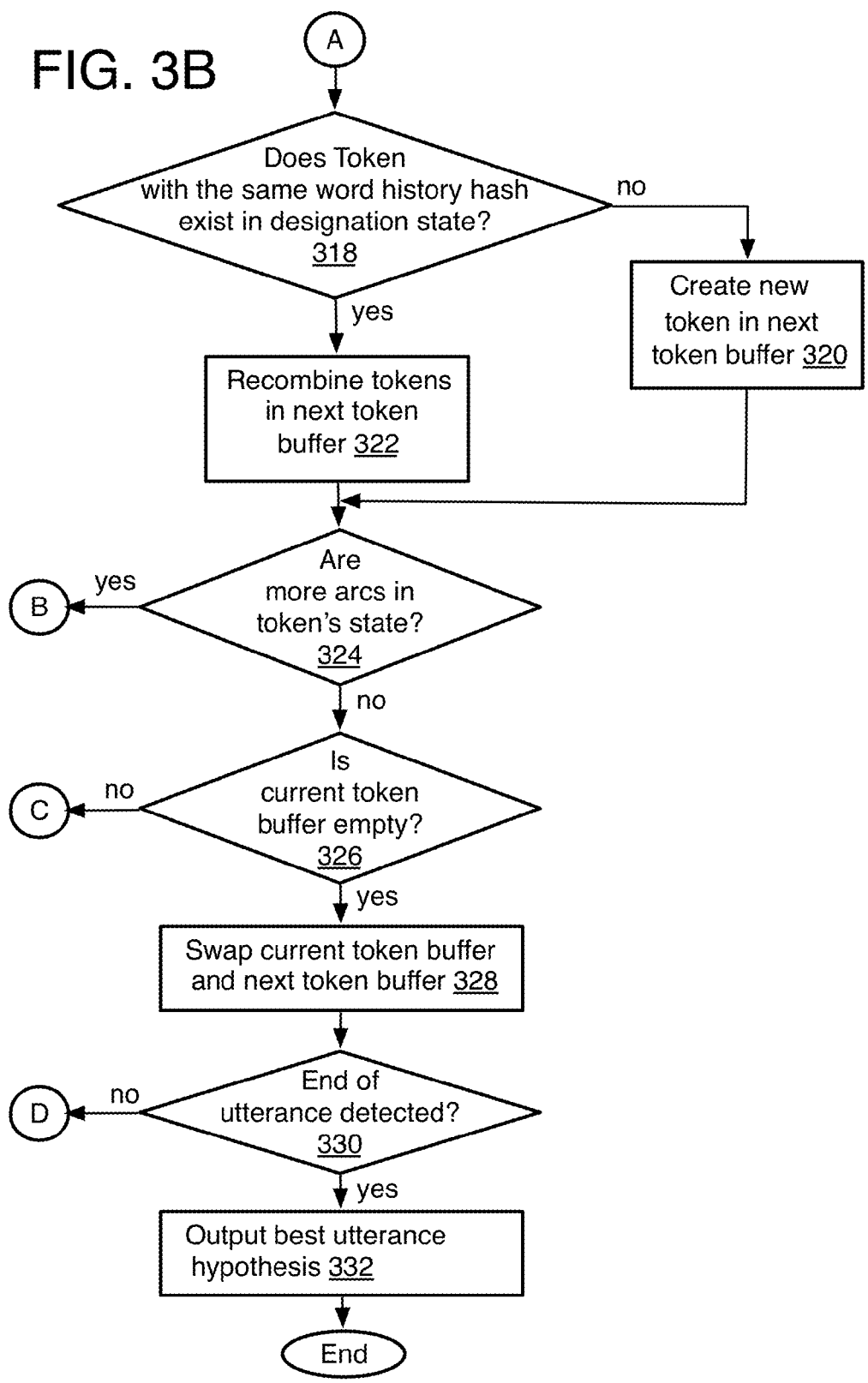
Figure 4:
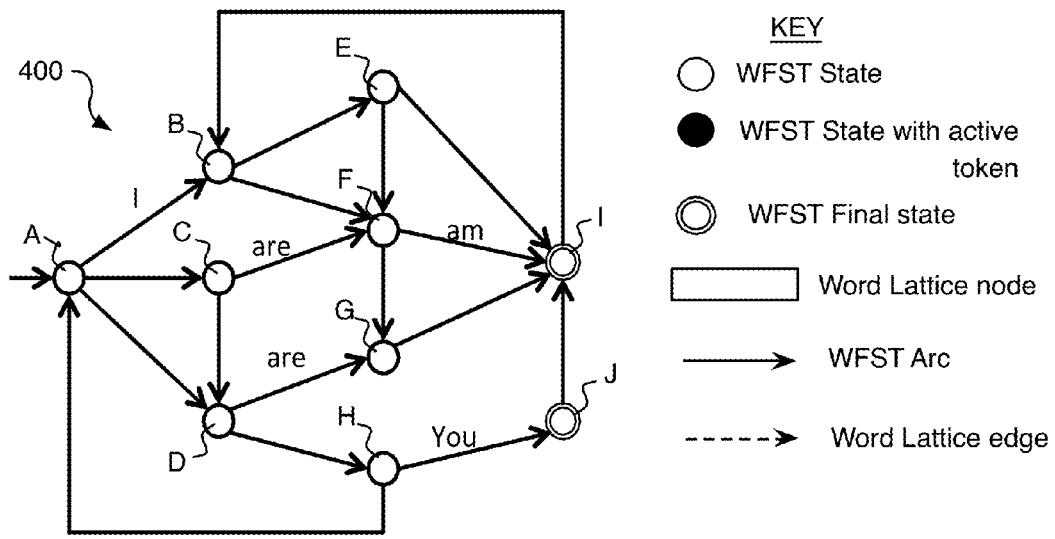
FIG. 4 is a graph of an example weighted finite state transducer (WFST) used for speech decoding.

Referring to FIGS. 3A-3B, an example computer-implemented process 300 for automatic speech recognition using on-the-fly word lattice generation with word histories is provided. In the illustrated implementation, process 300 may include one or more operations, functions or actions as illustrated by one or more of operations 302 to 332 numbered evenly. By way of non-limiting example, process 300 may be described herein with reference to example speech recognition devices described herein with any of FIGS. 1-2 and 4-13, and where relevant.

Process 300 may include obtaining 302 acoustic signal data. As mentioned above, this may include the use of a sound or audio capture device, pre-processing of the acoustic signal, and feature extraction by a front-end unit, and acoustic scoring by an acoustic scoring unit. By one approach, the feature extraction and acoustic scoring occurs before the WFST decoding begins. By another example, the acoustic scoring may occur just in time. If scoring is done just in time, it may be done on demand, i.e. only scores that are needed during WFST decoding are computed.

Referring to FIGS. 4-9, in order to assist with explaining process 300, a speech decoding WFST 400 which is used to generate a word lattice 402 is shown at different time periods corresponding to different frames. The WFST 400 is shown here with states A to J connected by arcs (the arrows) between the states. Of the arcs, only the output labels are shown if they are not epsilon. All input labels and weights are omitted to simplify the figure. The arcs are referred to herein by labeling the source state and then the destination state of the arc (for example arc AB extends from state A to state B). The explanation of other features of the graphs are explained along with the description of process 300. A key is provided with FIG. 4 that applies to all of FIGS. 5-9.

Figure 5:
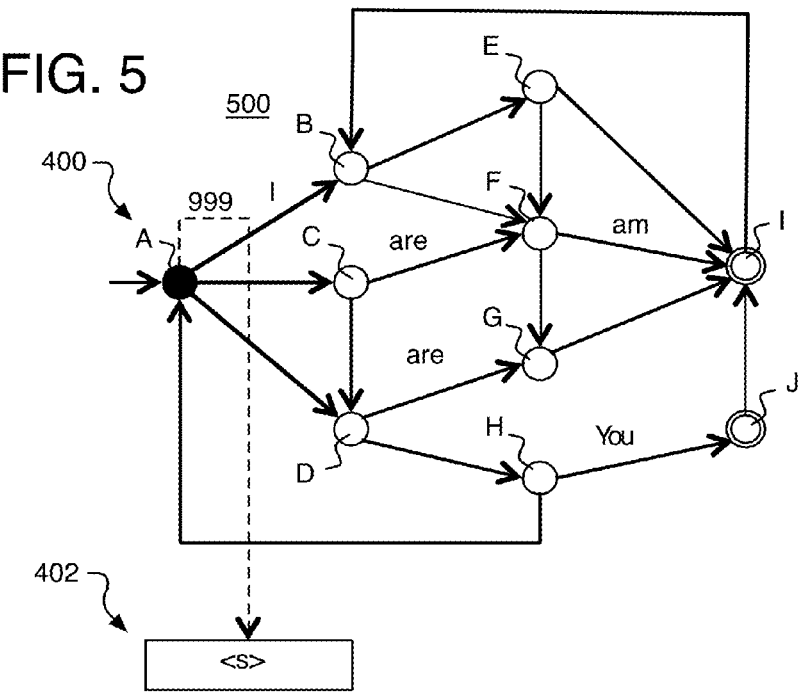
FIG. 5 is a graph of an example static and dynamic search space including an intermediate word lattice using the WFST from FIG. 4.

To begin constructing the word lattice, process 300 may include putting 304 an initial token in current token buffer. In one form, the token will be placed in the initial state of the WFST which corresponds to state A in the example of WFST 400. Also included in this operation, as shown in FIG. 5, the token in start state A includes a start word history designation (999) that means an empty sentence and a reference to the start node of the empty intermediate word lattice 402. The designation 999 is merely used as an example but can be many different values. By one approach detailed below, the word history designations are hash values determined from a hash function, and in one form may be hexadecimal values that are formed by using integers assigned to different words in the vocabulary being used and stored in a memory on the ASR system.

A token buffer, such as buffer 1326 (FIG. 13), may hold the tokens for the frames to be analyzed. Thus, there may be multiple token buffers such as one buffer for each frame. By one approach, this includes at least two token buffers including a current token buffer holding active tokens of the current frame, and a next token buffer holding the tokens of the next frame to be activated. In a different approach there may be only one token buffer which may be organized as a ring that holds both, tokens for the current and the next frame. This buffer may include a marker that separates current tokens from future tokens.

The process 300 may include calculate 306 acoustic features for the next time frame. Thus, one or more possible extracted features are determined, and in the present example, based on WFST operations, it is determined that there are three different destination states (B, C, and D). The token at state A is then taken 308 from the token buffer, and propagated 310 through each arc, and in this case the arcs AB, AC, and AD, using acoustic scores. Thus, it may be said that the token simultaneously propagates along three different possible pathways or sequences from the utterance start state which results in three created tokens that are placed in the token buffer for the next frame.

More specifically, the input labels of an arc may be the possibly context dependent phoneme, HMM, GMM density, DNN state or other acoustic ID, depending on the type of WFST used for decoding. The inputs are used to determine the acoustic score applied to a token that is propagated along the arc. The output labels of the arcs represent spoken words or other sentence fragments. If an output label of an arc is not epsilon (empty), and a token is passed along said arc, then the corresponding word or sentence fragment is appended to the utterance hypothesis of the token. Thus, for example, the output of arc AB is the word "I" meaning that if a token is passed along arc AB, then the underlying utterance hypothesis contains the word "I".

Figure 6:
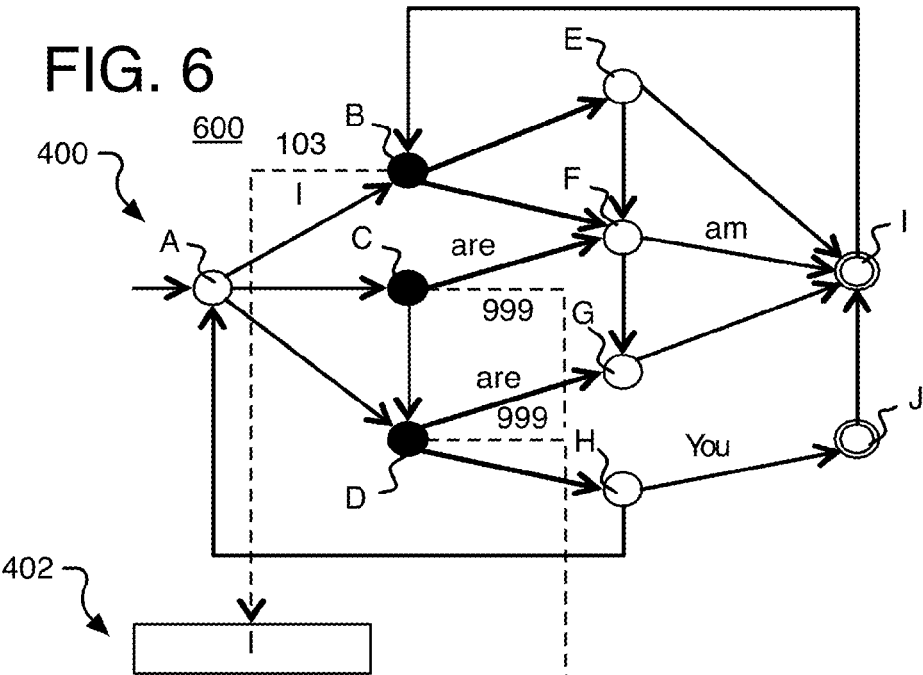
FIG. 6 is another graph of an example static and dynamic search space.
Figure 7:
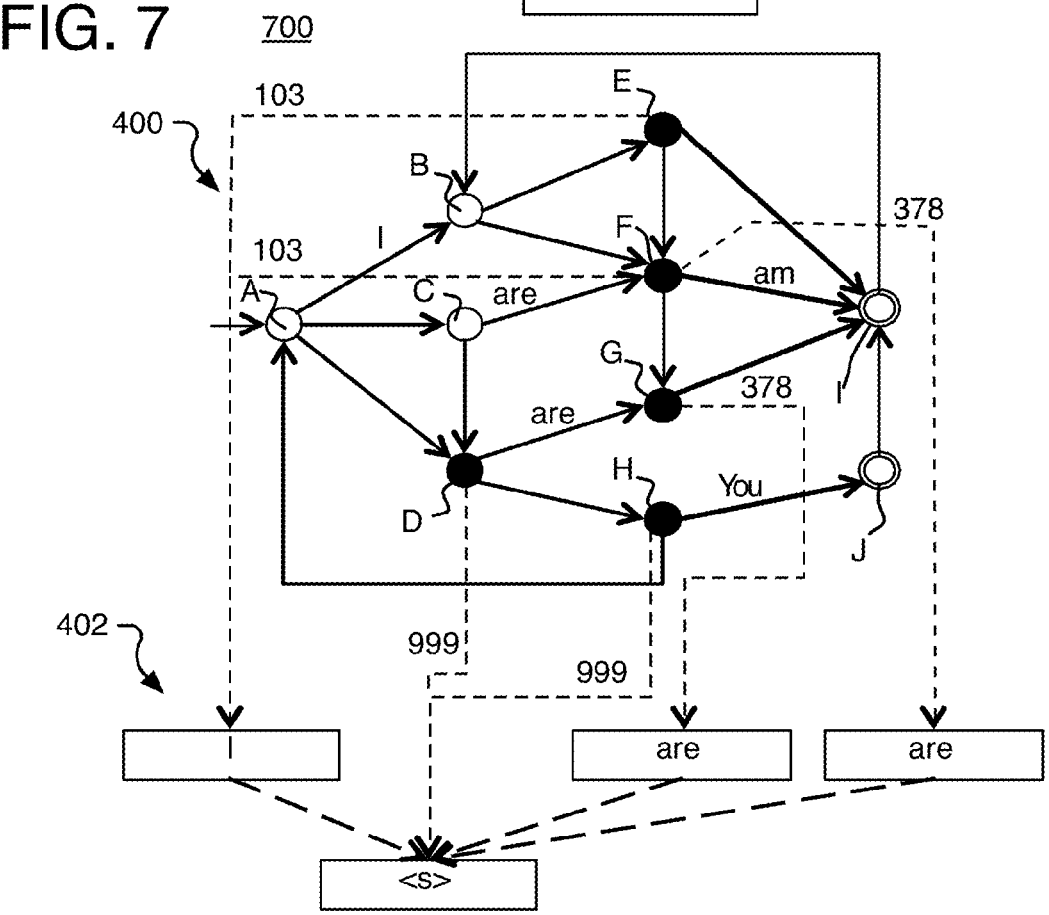
FIG. 7 is another graph of an example static and dynamic search space.

Thus, for the process 300, the next operation may be to determine "does the arc have an output label?" 312. If yes, as in the case of arc AB, a new node is created in the intermediate word lattice 314, and the token's word history hash is updated 316 as shown on first frame 600 of FIG. 6 for one example. The word history is provided with a designation 103 since a word was outputted, and the edge is formed placing the word "I" in the word lattice 402. The newly created node in the word lattice references the node in the lattice that was originally referenced by the token by placing an edge from the new node to the original. In the example of FIG. 6 this edge goes from the new node for "I" to the sentence start node. The token reference is updated to point to the newly created node. If there is no output label on the arc that the token is propagated along, as is e.g. the case for arc AC in FIG. 6, then neither the intermediate word lattice, the reference from the token to the node in the lattice, nor the word history designation are modified. Thus, in the example of FIG. 6, the token in state C references the sentence start node in the lattice and keeps the word history designation 999.

Skipping the operations for recombining tokens (318-322) for now, the process 300 checks for more arcs 324. In the present example, the process 300 loops so that arcs AC and AD can be analyzed in turn, and the tokens at states C and D would be established as well as establishing the starting word history designations 999 for each of the two tokens (FIG. 6). When there are no more arcs to analyze for the current active token, process 300 checks 326 to determine whether there are more tokens in the current token buffer. If so, the process 300 loops to take 308 the next token from the current token buffer, and the process 300 proceeds as mentioned before. Once the token buffer is empty for the current frame 326, the process 300 swaps 328 the current token buffer for the next frame token buffer. If the end of the utterance is not reached 330, the process 300 loops back to repeat the lattice building for the next frame, which becomes the current frame, and calculates 306 acoustic features again. In this case, the tokens in the states B, C, and D become the active tokens on the WFST 400 for first frame condition 600. The process repeats for each frame until either the audio input is completely processed or the end of the utterance was detected. End of utterance detection may be done by voice activity detection (VAD), stable times of utterance hypotheses, timeouts or any other methods that are suitable to determine if a speaker has finished talking.

Referring again to FIGS. 6-7 showing the search space in first frame (condition) 600 where active tokens are in the states B, C, and D of the WFST 400, nodes for the word "are" are placed in the intermediate word lattice 402 (as shown in the second frame 700) when tokens are passed along arcs CF and DG, their word history designations are updated to 378. The process 300 then may continue as explained above.

When the process 300 reaches the third frame 700 (FIG. 7) and the tokens in state B and C are passed along arcs BF and CF respectively in the WFST 400, there is a possible recombination because both tokens are in the same state F. According to the operation to check 318 whether the same word history hash exists in the destination state, a recombination is avoided because the tokens have the word history designations 378 and 103 respectively. Thus, both tokens remain in state F. More specifically, the word history designation values are propagated along with the tokens when no new word is formed. Thus, in the present example at frame condition 600 (FIG. 6), the token passed along arc BF has word history designation 103 from the previous frame while the token passed along arc CF outputting the word "are" has updated word history designation 378. To recombine in the conventional systems, the token with the worse acoustic score would have been dropped if both tokens are propagated into the same state F regardless of previous word history. In this case, however, both tokens are maintained because the two tokens being compared have different word history designations (103 versus 378).

Figure 8:
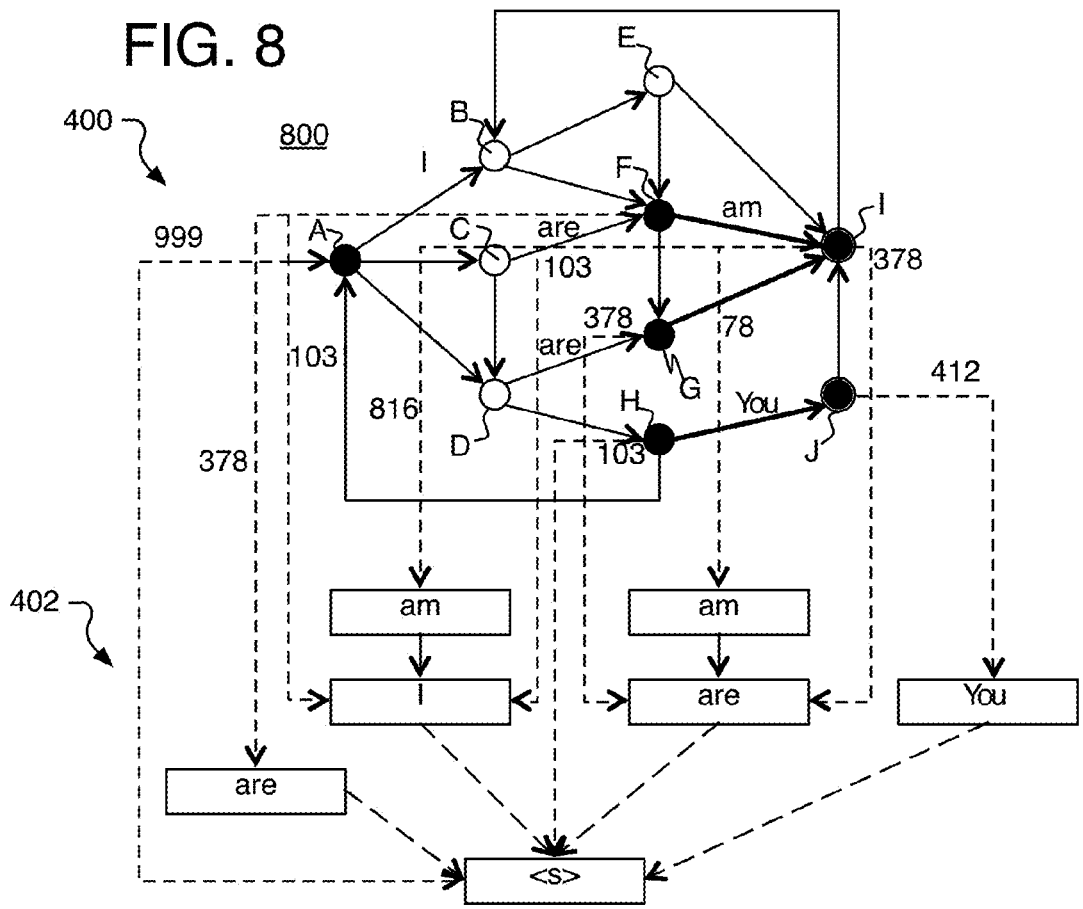
FIG. 8 is another graph an example static and dynamic search space.

Referring to FIG. 8, the fourth frame 800 is shown where tokens are propagated into states A, F, G, H, I and J. Here, four different tokens are propagated into state I. Two tokens are propagated over arc FI and one token each over arcs EI and GI. There is no recombination taking place because all four word history designations are different (816, 103, 78 and 378).

In one case, the token which is propagated along arc DG is now removed due to recombination because the token that is propagated along path FG has the same destination state, the same word designation (378) and in our example the better score. As mentioned, in this case, the token with the worse score is dropped.

Also on WFST 400 (frame condition 800), two word lattice nodes for "am" are formed from the two tokens that are propagated along arc FI. One of the tokens had the word designation 103 (representing "I") in the previous frame. The token's word history designation is updated to 816 (representing "I am"). The other token had the word history designation 378 (representing "are") and is updated to 78 (representing "are am").

Once the end of the utterance is detected 330, the process 300 then may include "output best utterance hypothesis" 332, and particularly provide the completed word lattice 402 to the interpretation engine to determine the best word sequence from those presented by the word lattice.

Figure 9:
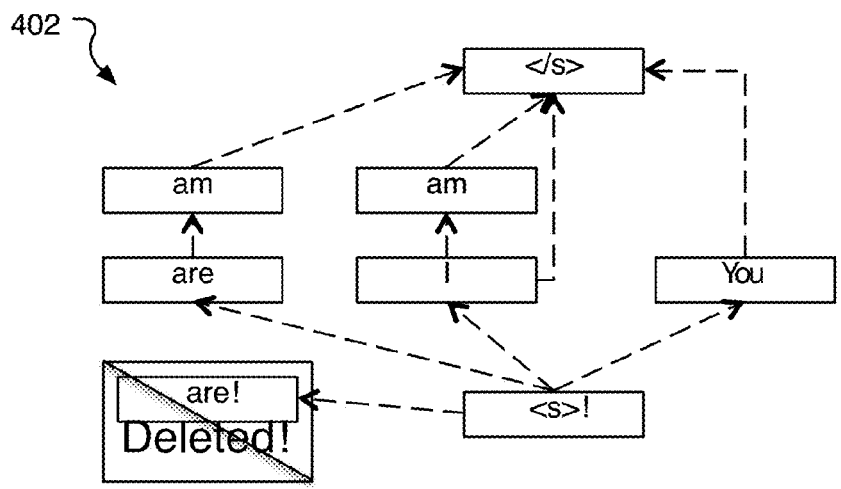
FIG. 9 is a graph of an example word lattice.

Referring to FIG. 9, the generated and completed word lattice 402 is shown. The word lattice is generated by taking all tokens which are in a final state (at the final states I and J for example) as possible sentence end hypotheses. Also, the direction of the edges are reversed now to show the flow from start of utterance to the end of the utterance, which has the symbol </s>. Any node that does not reach the end of the utterance node is deleted. Thus, the second "are" that was dropped due to recombination is now deleted from the word lattice 402 as shown. The lattice represents the sentences "are", "are am", "I", "I am", and "you".

Figure 10:
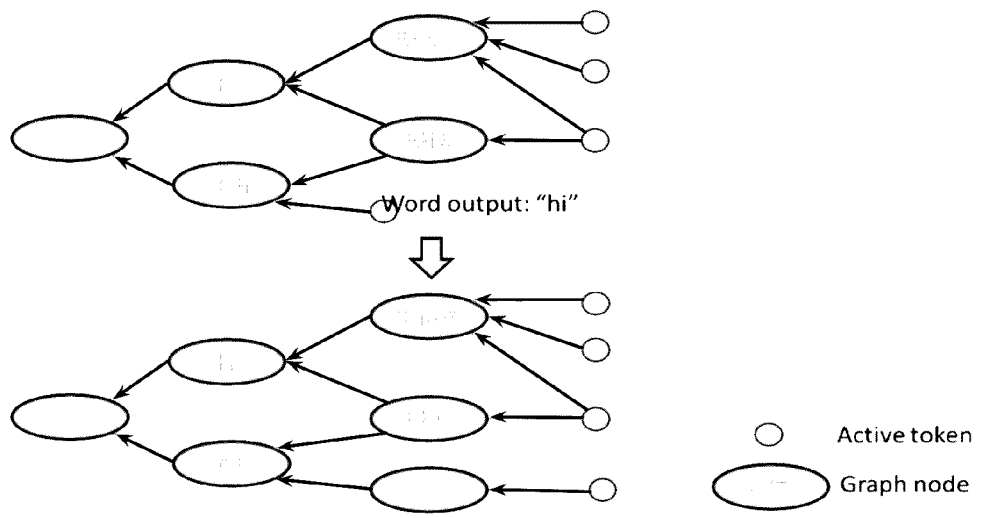
FIG. 10 is a graph of an example intermediate word lattice.
Figure 11:
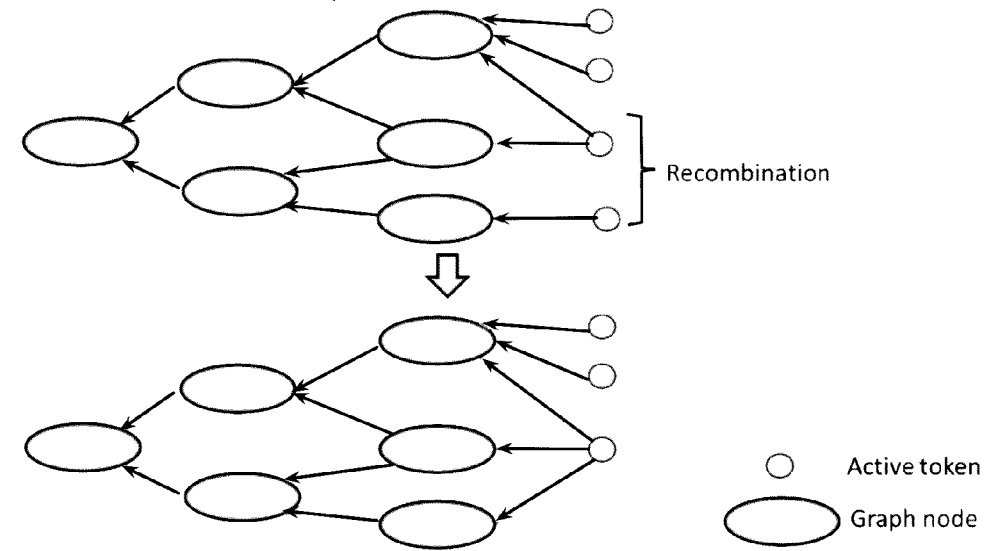
FIG. 11 is another graph of the example intermediate word lattice of FIG. 10.
Figure 12:
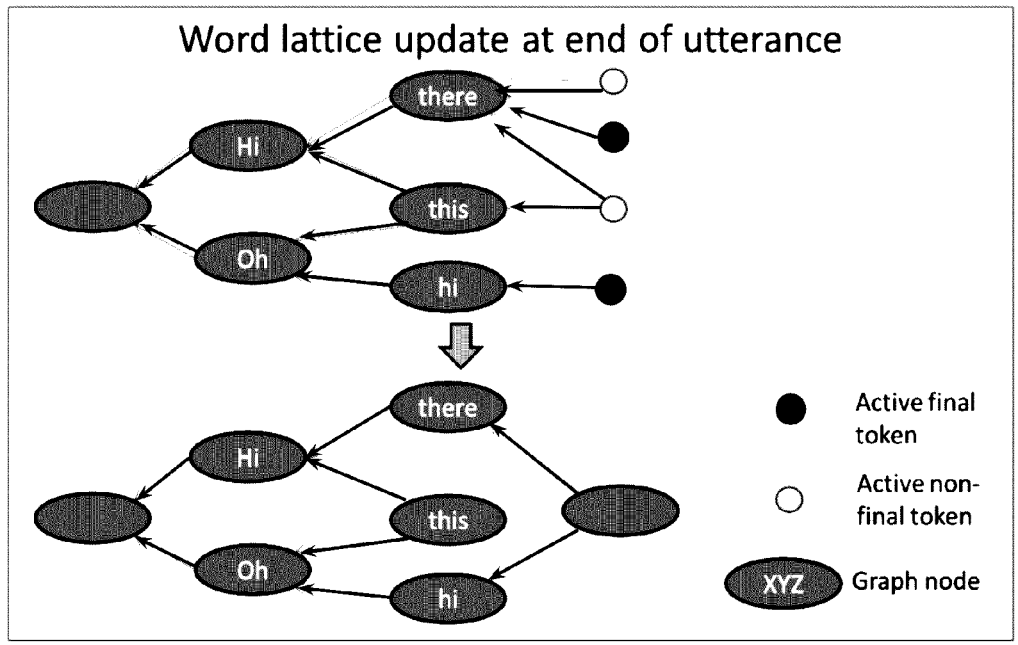
FIG. 12 is another graph of the example intermediate word lattice of FIG. 10.

Referring to FIGS. 10-12, further details for generating a word lattice 1000 is provided. Another way to show the generation of the word lattice is to show the word lattice with active tokens integrated with the graph of the word lattice being generated, showing the insertion of word nodes at the nodes that tokens point to. The word lattice generated by the approaches once again is a directed graph. The nodes of the graph represent hypotheses of single words while the edges of the graph represent a "is successor of" property, i.e. the graph is directed from the end of the utterance to the beginning of the utterance as explained above for word lattice 402. During decoding, each token has one or more references to nodes in the word lattice 1000 that represent the history of the word output hypotheses as shown in FIG. 10. When a token update results in a new output word, the word is inserted into the word lattice with the same edges that the token had. The updated token references the new node. The word history hash of the token is updated using the recursive hashing function explained below. An example of a word output "hi" that is added to the word lattice 1000 during decoding is shown in FIG. 10.

As explained above, token recombination is handled differently than the conventional process that does not perform on-the-fly word lattice generation. Normally, tokens are recombined if they merely correspond to the same WFST state. As explained above, herein tokens are only recombined, or mainly, or usually only recombined, if the tokens correspond to the same WFST state and also have the same word history designation or hash for example. That way, the loss of lattice information is minimized during token recombination without much computational overhead.

Referring to FIG. 11, the disclosed recombination processes have an exception. In order to keep the number of active tokens small, tokens corresponding to the same state but with different word histories (and in turn different word history designations) are occasionally recombined anyway resulting in a lattice update. When tokens with different word histories are recombined for this purpose, all references to lattice nodes that are present in either of the two tokens are combined into the new token in order to retain word lattice information. If a reference to a node is present in both tokens, the reference with the worse score is discarded. Such an update is exemplified in FIG. 11 showing the word sequences ending at "there", "this", and "hi" are combined to a single active token despite each clearly having different word history designations. This update should not be performed too often since such a lattice update may be relatively costly compared to the other recombinations since all references to lattice nodes of both tokens have to be compared in order to find duplicates. Such a dynamic update may be limited by time interval (such as approximately one every 100 ms) or if a target number of active tokens is reached. This exception update is not necessary for the word lattice generation to be accurate and may not be needed if only single sentences are recognized. It may be used only when recognition is running for a long time (e.g. dictation) in order to reduce the number of active tokens.

Referring to FIG. 12, at the end of the utterance, there is usually more than one active token representing the end of the utterance. Instead of taking the best token as is performed in first best decoding, all active tokens that correspond to final nodes in the WFST are combined into one utterance end node of the word lattice. The end of utterance processing can be seen in FIG. 12 where the "there" and "hi" tokens are combined into a single final node. This results in alternative word sequences on the word lattice (some that end in "there", others that end in "hi") that may be considered by the interpretation engine in contrast to the conventional processes that would only consider one best final word.

Returning now to the generation of word history designations, by one approach the designations are hash values (or simply hashes) formed by using a hash function. By one example, the assignment of the word history designations relies on integer values that represent word sequences. Hashing is used in order to generate those integers. The hashing can be seen as a function h from strings of words to a single integer. For the lattice generation, the hash function needs to be recursive, such that for the empty sentence £ and every sequence of words ($w_1, w_2, \ldots, w_n$):

$$h(\epsilon) = h_0 \tag{1}$$

$$h(w_1, w_2, \ldots, w_n) = \tilde{h}(h(w_1, w_2, \ldots, w_{n-1}), w_n) \tag{2}$$

There are several ways to build hash values recursively. One property is that there are few collisions (in other words, it is very unlikely that different inputs will result in the same output). As mentioned above, the word history hash is stored in every active token during decoding, and it is used to avoid token recombination with those tokens with different word histories as explained above. Thus, if two different word histories result in the same hash values, information may be lost in the lattice due to token recombination.

The hash function that may be used to determine word history designations may include cyclic redundancy check (CRC) hash functions, hash functions called checksums that are sum type of functions, non-cryptographic hash functions, cryptographic hash functions and others. For hardware implementations, cyclic redundancy checks (CRCs) are better because there are very efficient. For software implementations, non-cryptographic hash functions are usually best suited because they are often very fast to compute and have reasonably good key distributions. Checksums may not be as accurate as these other hash functions because they usually are position independent, i.e. the sentences "I am here" and "am I here" result in the same checksum. Also, cryptographic hash functions can be computationally expensive, but still may be suitable as well.

By one example, the hash function may be a 32-bit version of the hash function implementation in sdbm (a public-domain reimplementation of ndbm (new database manager)) and is used with an sdbm database library. As a hashing function, it is computationally efficient and appears to be sufficient in terms of key distribution. The actual function is h(i)=h(i−1)·65599+str[i] for a string str at character i. The constant 65599 (0x1003F in hexadecimal) as multiplicative value was picked randomly and found to be sufficient. Possible pseudo code for the sdbm hash tag function is as follows (below in pseudo code is a fast version used in gawk that uses bit shift operations to implement the multiplication):

```
static unsigned long
sdbm(str)
unsigned char *str;
{
    unsigned long hash = 0;
    int c;
    while (c = *str++)
        hash = c + (hash << 6) + (hash << 16) - hash;
    return hash;
}
```

Other hash functions like MurmurHash might deliver as good as or better results.

To create a hash for an utterance, a 1:1 mapping of words to integers may be established and stored for the vocabulary that is being used, for example.

| | |
|---|---|
| yes | 1 |
| here | 2 |
| there | 3 |
| I | 4 |
| am | 5 |

For this example, the sentence "I am here" is represented by "4 5 2".

The hashing process also may use common hexadecimal notation with values 1-9 and A-F corresponding to values 10-15. For an empty utterance and the initial token that is created at the beginning of an utterance, the hash value 0xFFFFFFFF may be used. Many other values could work as well. All tokens that are created from this token copy the hash value as long as no word is hypothesized during token creation propagating the hash value (or word history designation) along the arcs in the lattice as well.

When for example the first word "I" is hypothesized, the word history hash value of the corresponding token is updated:

$$h("I") = modulo_{0xFFFFFFFF}(w_I + h(\epsilon) \cdot 0x1003F)$$

$$= modulo_{0xFFFFFFFF}(0x4 + 0xFFFFFFFF \cdot 0x1003F)$$

$$= modulo_{0xFFFFFFFF}(0x1003EFFFEFFC5)$$

$$= 0xFFEFFC5$$

When the next word "am" appears for a token that had the hash value 0xFFFEFFC5, the hash value is updated again:

$$h("I\ am") = modulo_{0xFFFFFFFF}(0x5 + 0xFFEFFC5 \cdot 0x1003F) = 0xFF85F180$$

$$h("I\ am\ here") = modulo_{0xFFFFFFFF}(0x2 + 0xFF85F180 \cdot 0x1003F) = 0xD3766E82$$

The combination of operators in the hash function equation results in different designation values depending on the order of the words in the sequence even though two word sequences may include the same words. If there is another token in the same node but that has the word history "am I here" instead of "I am here", it has the word history hash value 0xD3F37DC4 which is different from 0xD3766E82, and the two tokens are not normally combined in the present process. In this case, both tokens and both word history designations are maintained at the same state unless an exception update occurs as described above.

The processes described above do not need to build an intermediate phone or state lattice which requires more RAM than an efficient word lattice. Thus, the approach described herein requires less memory to operate. Also, performance measurements did not show a measurable reduction in decoding speed using the approach herein compared to a single-best Viterbi decoding. As single-best Viterbi decoding is considered to be one of the easiest and fastest ways to decode an utterance, it is assumed that the present approach is not significantly slower than any other known method to generate word lattices.

It will be appreciated that processes 200 and/or 300 may be provided by sample ASR systems 10 and/or 1300 to operate at least some implementations of the present disclosure. This includes operation of an acoustic front-end unit 1308, acoustic scoring unit 1310, WFST decoder 1312, and language interpreter execution unit 1314, as well as others, in speech recognition processing system 1300 (FIG. 13) and similarly for system 10 (FIG. 1).

In addition, any one or more of the operations of FIGS. 2-3 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
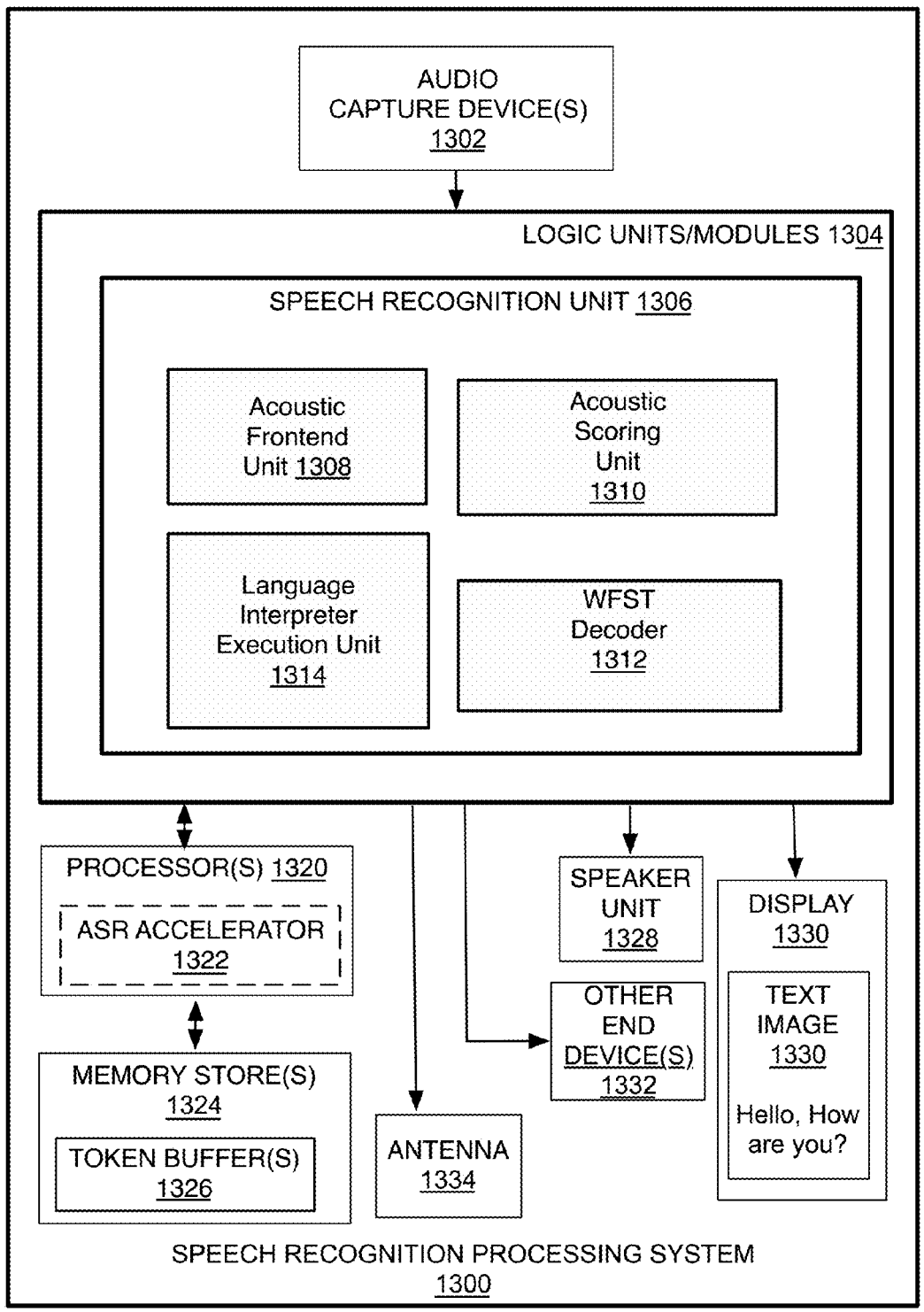
FIG. 13 is an illustrative diagram of an example system.

Referring to FIG. 13, an example image processing system 1300 is arranged in accordance with at least some implementations of the present disclosure. In various implementations, the example speech recognition processing system 1300 may have an audio capture device(s) 1302 to form or receive acoustical signal data. This can be implemented in various ways. Thus, in one form, the speech recognition processing system 1300 may be an audio capture device such as a microphone, and audio capture device 1302, in this case, may be the microphone hardware and sensor software, module, or component. In other examples, speech recognition processing system 1300 may have an audio capture device 1302 that includes or may be a microphone, and logic modules 1304 may communicate remotely with, or otherwise may be communicatively coupled to, the audio capture device 1302 for further processing of the acoustic data.

In either case, such technology may include a telephone, a smart phone, a dictation machine, other sound recording machine, a mobile device or an on-board device, or any combination of these. Thus, in one form, audio capture device 1302 may include audio capture hardware including one or more sensors as well as actuator controls. These controls may be part of a sensor module or component for operating the sensor. The sensor component may be part of the audio capture device 1302, or may be part of the logical modules 1304 or both. Such sensor component can be used to convert sound waves into an electrical acoustic signal. The audio capture device 1302 also may have an A/D converter, other filters, and so forth to provide a digital signal for speech recognition processing.

In the illustrated example, the logic modules 1304 may include an acoustic front-end unit 1308 that provides pre-processing as described with unit 18 (FIG. 1) and that identifies acoustic features, an acoustic score unit 1310 that provides acoustic scores for the acoustic features, a WFST decoder 1312 that provides a word lattice as described herein, and a language interpreter execution unit 1314 that determines a best word sequence to match the acoustic signal. The WFST decoder unit 1312 may be operated by, or even entirely or partially located at, processor(s) 1320, and which may include, or connect to, an accelerator 1322 to perform at least the WFST decoding with word history sensitivity or acoustic scoring or both. The logic modules may be communicatively coupled to the components of the audio capture device 1302 in order to receive raw acoustic data. The logic modules 1304 may or may not be considered to be part of the audio capture device.

The speech recognition processing system 1300 may have one or more processors 1320 which may include a dedicated accelerator 1322 such as the Intel Atom, memory stores 1324 which may or may not hold the token buffers 1326 as well as vocabulary, word history tables, and so forth mentioned herein, at least one speaker unit 1328 to provide auditory responses to the input acoustic signals, one or more displays 1328 to provide images 1330 of text as a visual response to the acoustic signals, other end device(s) 1332 to perform actions in response to the acoustic signal, and antenna 1334. In one example implementation, the image processing system 1300 may have the display 1328, at least one processor 1320 communicatively coupled to the display, at least one memory 1324 communicatively coupled to the processor and having a token buffer 1326 by one example for storing the tokens as explained above. The antenna 1334 may be provided for transmission of the best word sequence matched to the input acoustic signal or other relevant commands to other devices that may act upon such a determination. Otherwise, the results of the speech recognition process may be stored in memory 1324. As illustrated, any of these components may be capable of communication with one another and/or communication with portions of logic modules 1304 and/or audio capture device 1302. Thus, processors 1320 may be communicatively coupled to both the audio capture device 1302 and the logic modules 1304 for operating those components. By one approach, although image processing system 1300, as shown in FIG. 13, may include one particular set of blocks or actions associated with particular components or modules, these blocks or actions may be associated with different components or modules than the particular component or module illustrated here.

Figure 14:
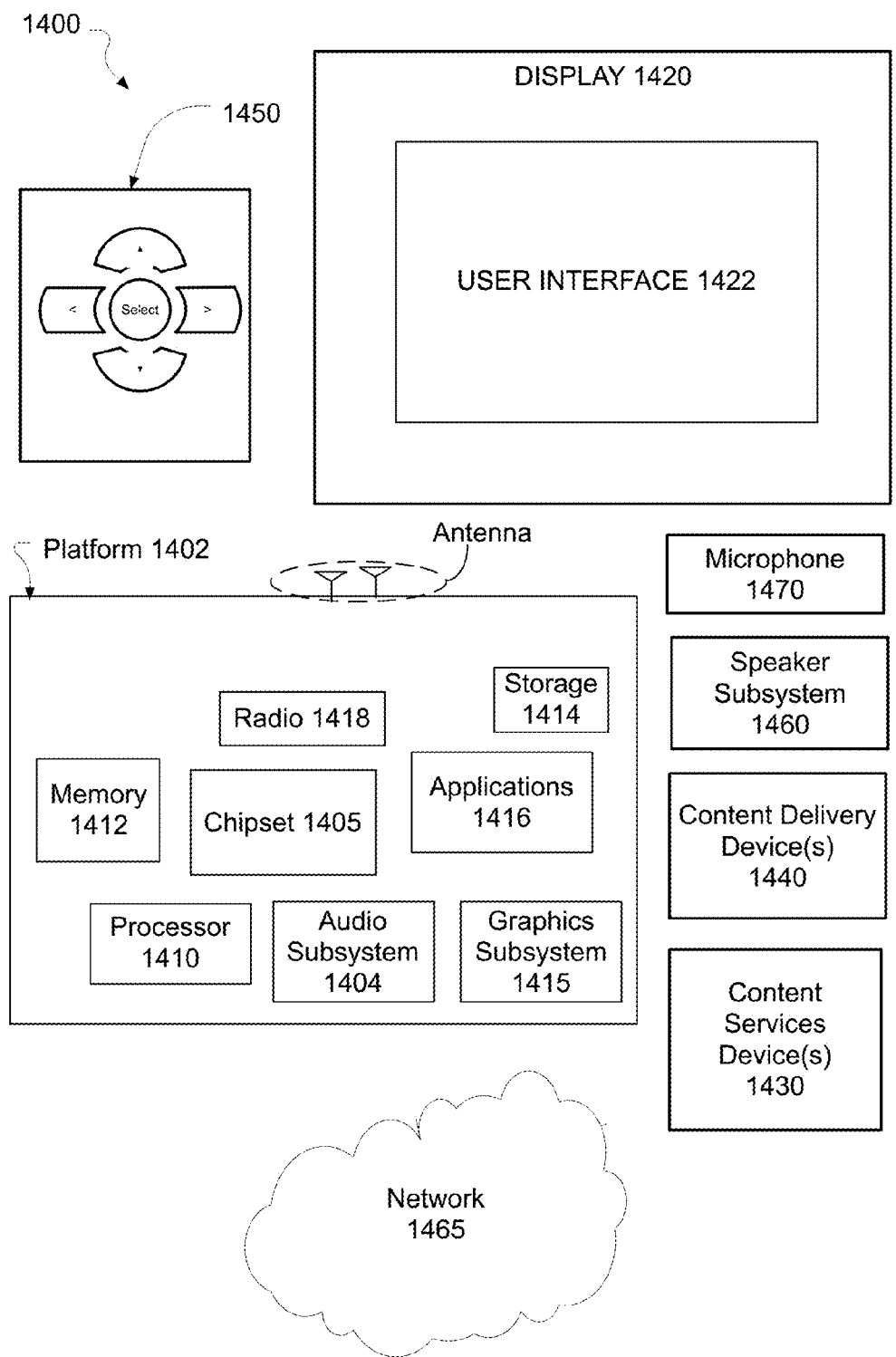
FIG. 14 is an illustrative diagram of another example system.

Referring to FIG. 14, an example system 1400 in accordance with the present disclosure operates one or more aspects of the image processing system described herein. It will be understood from the nature of the system components described below that such components may be associated with, or used to operate, certain part or parts of the image processing system described above. In various implementations, system 1400 may be a media system although system 1400 is not limited to this context. For example, system 1400 may be incorporated into a microphone, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402, speaker 1470, microphone 1470, and/or display 1420. Each of these components is described in greater detail below.

In various implementations, platform 1402 may include any combination of a chipset 1405, processor 1410, memory 1412, storage 1414, audio subsystem 1404, graphics subsystem 1415, applications 1416 and/or radio 1418. Chipset 1405 may provide intercommunication among processor 1410, memory 1412, storage 1414, audio subsystem 1404, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Audio subsystem 1404 may perform processing of audio such as acoustic signals for speech recognition as described herein and/or voice recognition. The audio subsystem 1404 may comprise one or more processing units and accelerators. Such an audio subsystem may be integrated into processor 1410 or chipset 1405. In some implementations, the audio subsystem 1404 may be a stand-alone card communicatively coupled to chipset 1405. An interface may be used to communicatively couple the audio subsystem 1404 to a speaker 1460, microphone 1470, and/or display 1420.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further embodiments, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420, speaker 1460, and microphone 1470. Platform 1402 and/or content services device(s) 1430 may be coupled to a network 1465 to communicate (e.g., send and/or receive) media information to and from network 1465. Content delivery device(s) 1440 also may be coupled to platform 1402, speaker 1460, microphone 1470, and/or to display 1420.

In various implementations, content services device(s) 1430 may include a microphone, a cable television box, personal computer, network, telephone, Internet enabled devices or appliance capable of delivering digital information and/or content, and any other similar device capable of unidirectionally or bidirectionally communicating content between content providers and platform 1402 and speaker subsystem 1460, microphone 1470, and/or display 1420, via network 1465 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In embodiments, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1404 also may be used to control the motion of articles or selection of commands on the interface 1422.

Movements of the navigation features of controller 1450 may be replicated on a display (e.g., display 1420) by movements of a pointer, cursor, focus ring, or other visual indicators displayed on the display or by audio commands. For example, under the control of software applications 1416, the navigation features located on navigation controller 1450 may be mapped to virtual navigation features displayed on user interface 1422, for example. In embodiments, controller 1450 may not be a separate component but may be integrated into platform 1402, speaker subsystem 1260, microphone 1470, and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example, or by auditory command. Program logic may allow platform 1402 to stream content to media adaptors or other content services device(s) 1430 or content delivery device(s) 1440 even when the platform is turned "off" In addition, chipset 1405 may include hardware and/or software support for 8.1 surround sound audio and/or high definition (7.1) surround sound audio, for example. Drivers may include an auditory or graphics driver for integrated auditory or graphics platforms. In embodiments, the auditory or graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various embodiments, platform 1402, speaker 1460, microphone 1470, and/or display 1420 may be an integrated unit. Display 1420, speaker 1460, and/or microphone 1470 and content service device(s) 1430 may be integrated, or display 1420, speaker 1460, and/or microphone 1470 and content delivery device(s) 1440 may be integrated, for example. These examples are not meant to limit the present disclosure.

In various embodiments, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
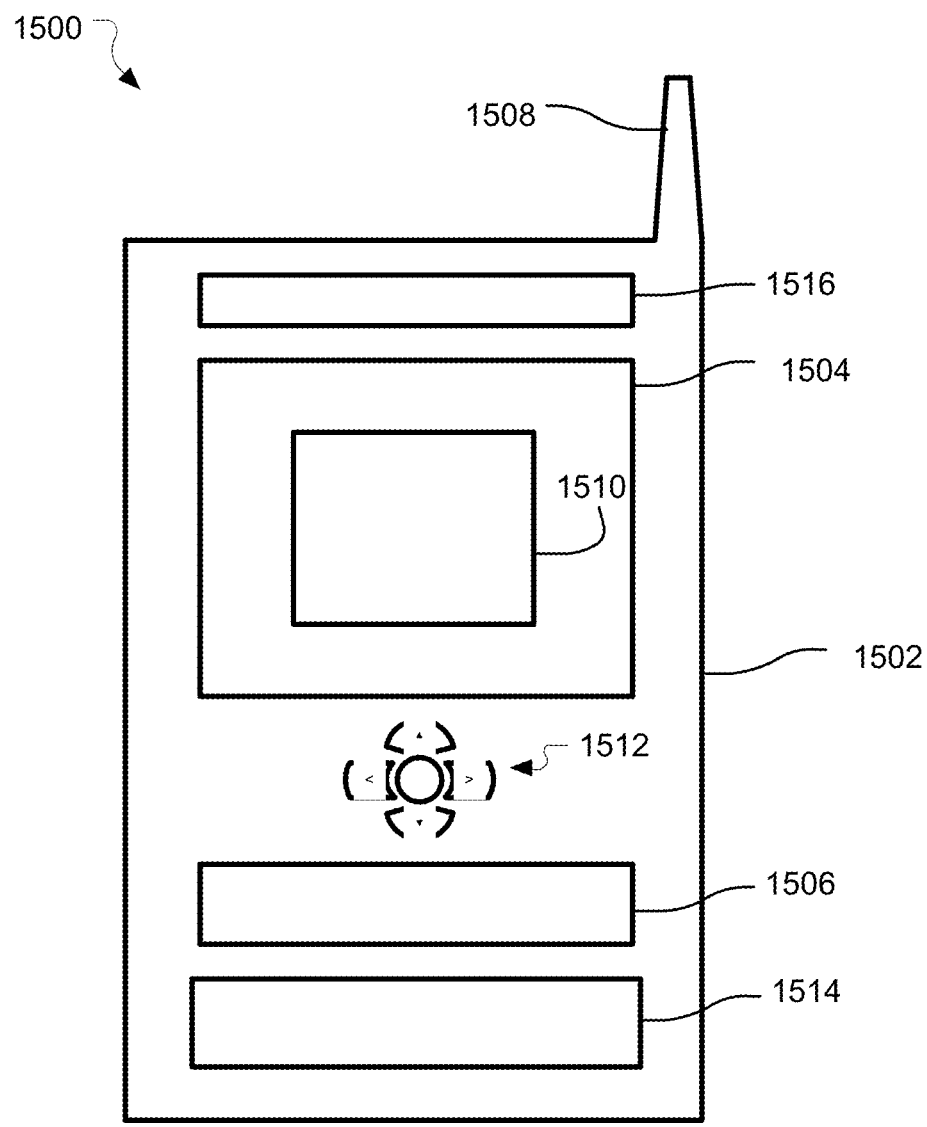
FIG. 15 illustrates another example device, all arranged in accordance with at least some implementations of the present disclosure.

Referring to FIG. 15, a small form factor device 1500 is one example of the varying physical styles or form factors in which system 1400 may be embodied. By this approach, device 1500 may be implemented as a mobile computing device having wireless capabilities. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, and any other on-board (such as on a vehicle) computer that may accept audio commands.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 15, device 1000 may include a housing 1502, a display 1504 including a screen 1510, an input/output (I/O) device 1506, and an antenna 1508. Device 1500 also may include navigation features 1015. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, software and so forth. Information also may be entered into device 1500 by way of microphone 1514. Such information may be digitized by a speech recognition device as described herein as well as a voice recognition devices and as part of the device 1500, and may provide audio responses via a speaker 1516 or visual responses via screen 1210. The embodiments are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of speech recognition comprises propagating tokens through a weighted finite state transducer (WFST) having arcs and words or word identifiers as output labels of the WFST, and comprising placing word sequences into a word lattice. The method also comprises generating a word history designation for individual tokens when a word is established at a token propagating along one of the arcs with an output symbol, wherein the word history designation indicates a word sequence, and determining whether or not two or more tokens should be combined to form a single token in a state of the WFST by using, at least in part, the word history designations.

By another implementation, the method also may comprise recombining two or more tokens in the same node of the WFST when the word history designations of the tokens are the same and avoiding a recombination when the word history designations of two or more tokens are not the same, and placing the word established at an arc of the WFST with an output label into a word lattice as the tokens are being propagated, as well as performing an exception update of the word lattice by recombining multiple tokens into a single new active token when the word history designations of the multiple tokens are different. This may comprise placing word lattice node references of the multiple tokens into the new active token when the references are unique to other references from other ones of the multiple tokens, and maintaining the reference with the best score for the new active token when the reference is the same among more than one of the multiple tokens. The method further may comprise assigning a different value to individual words in a vocabulary of possible words to be used as output symbols of the WFST, and using multiple values corresponding to multiple words to determine the word history designation, and combining multiple final end tokens into a single utterance end token, wherein the designation is a hash tag formed by using a recursive hash function, and wherein the word history designation is different depending on the order of the words within the word sequence.

By yet another implementation, a computer-implemented system of speech recognition comprises at least one acoustic signal receiving unit, at least one processor communicatively connected to the acoustic signal receiving unit, at least one memory communicatively coupled to the at least one processor, and a weighted finite state transducer (WFST) decoder communicatively coupled to the processor, and to propagate tokens through a weighted finite state transducer (WFST) having words or word identifiers as output labels of the WFST. This may comprise placing word sequences into a word lattice. The WFST decoder also may be provided to generate a word history designation for individual tokens when a word is established at an arc of the WFST with an output symbol, wherein the word history designation indicates a word sequence, and to determine whether or not two or more tokens should be combined to form a single token in a state of the WFST by using, at least in part, the word history designations.

By another example, the system provides the WFST decoder is to recombine two or more tokens in the same state of the WFST when the word history designations of the tokens are the same, avoid a recombination when the word history designations of two or more tokens are not the same, place the word established at an arc of the WFST with an output label into a word lattice as tokens are being propagated, perform an exception update of the word lattice by recombining multiple tokens into a single new active token when the word history designations of the multiple tokens are different. This last operation may comprise having the WFST decoder place word lattice node references of the multiple tokens into the new active token when the references are unique to other references from other ones of the multiple tokens, and maintain the reference with the best score for the new active token when the reference is the same among more than one of the multiple tokens. Otherwise, the WFST decoder may be provided to assign a different value to individual words in a vocabulary of possible words to be used as output symbols of the WFST, and using multiple values corresponding to multiple words to determine the word history designation, and combine multiple final end tokens into a single utterance end token, wherein the designation is a hash tag formed by using a recursive hash function, and wherein the word history designation is different depending on the order of the words within the word sequence.

By one approach, at least one computer readable medium comprises a plurality of instructions that in response to being executed on a computing device, causes the computing device to propagate tokens through the weighted finite state transducer (WFST) having words or word identifiers as output labels of the WFST, and comprises placing word sequences into a word lattice. The computing device is computed to generate a word history designation for individual tokens when a word is established at a token propagating along an arc with an output symbol, wherein the word history designation indicates a word sequence, and determine whether or not two or more tokens should be combined to form a single token in a state of the WFST by using, at least in part, the word history designations.

By another approach, the instructions cause the computing device to recombine two or more tokens in the same state of the WFST when the word history designations of the tokens are the same and avoid a recombination when the word history designations of two or more tokens are not the same, place the word established at an arc of the WFST with an output label into a word lattice as tokens are being propagated, perform an exception update of the word lattice by recombining multiple tokens into a single new active token when the word history designations of the multiple tokens are different, and comprising placing word lattice node references of the multiple tokens into the new active token when the references are unique to other references from other ones of the multiple tokens, and maintaining the reference with the best score for the new active token when the reference is the same among more than one of the multiple tokens. The WFST also may be provided to assign a different value to individual words in a vocabulary of possible words to be used as output symbols of the WFST, and use multiple values corresponding to multiple words to determine the word history designation, as well as combine multiple final end tokens into a single utterance end token, wherein the designation is a hash tag formed by using a recursive hash function, and wherein the word history designation is different depending on the order of the words within the word sequence.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of automatic speech recognition, comprising:
    propagating, by at least one processor, tokens that are each associated with one or more sounds from a recording of a person talking and that is at least part of a word, through a weighted finite state transducer (WFST) having arcs and words or word identifiers as output labels of the WFST, and comprising placing word sequences into a word lattice;
    generating, by at least one processor, a word history designation for individual tokens when a word is established at a token propagating along one of the arcs with an output symbol, wherein the word history designation indicates a word sequence; and
    determining, by at least one processor, whether or not two or more tokens should be combined to form a single token in a state of the WFST by using, at least in part, the word history designations so that the recorded sounds are transformed into data that indicates recognition of an utterance by using, at least in part, the word history designations.

2. The method of claim 1 comprising recombining two or more tokens in the same node of the WFST when the word history designations of the tokens are the same and avoiding a recombination when the word history designations of two or more tokens are not the same.

3. The method of claim 1 comprising placing the word established at an arc of the WFST with an output label into a word lattice as the tokens are being propagated.

4. The method of claim 3 comprising performing an exception update of the word lattice by recombining multiple tokens into a single new active token when the word history designations of the multiple tokens are different, and comprising:

placing word lattice node references of the multiple tokens into the new active token when the references are unique to other references from other ones of the multiple tokens, and maintaining the reference with the best score for the new active token when the reference is the same among more than one of the multiple tokens.

5. The method of claim 1 wherein the designation is a hash tag formed by using a recursive hash function.

6. The method of claim 1 comprising assigning a different value to individual words in a vocabulary of possible words to be used as output symbols of the WFST, and using multiple values corresponding to multiple words to determine the word history designation.

7. The method of claim 1 wherein the word history designation is different depending on the order of the words within the word sequence.

8. The method of claim 1 comprising combining multiple final end tokens into a single utterance end token.

9. The method of claim 1 comprising recombining two or more tokens in the same node of the WFST when the word history designations of the tokens are the same and avoiding a recombination when the word history designations of two or more tokens are not the same;

placing the word established at an arc of the WFST with an output label into a word lattice as the tokens are being propagated;

performing an exception update of the word lattice by recombining multiple tokens into a single new active token when the word history designations of the multiple tokens are different, and comprising:

placing word lattice node references of the multiple tokens into the new active token when the references are unique to other references from other ones of the multiple tokens, and maintaining the reference with the best score for the new active token when the reference is the same among more than one of the multiple tokens;

assigning a different value to individual words in a vocabulary of possible words to be used as output symbols of the WFST, and using multiple values corresponding to multiple words to determine the word history designation; and combining multiple final end tokens into a single utterance end token;

wherein the designation is a hash tag formed by using a recursive hash function; and wherein the word history designation is different depending on the order of the words within the word sequence.

10. A computer-implemented system of automatic speech recognition comprising:

at least one acoustic signal receiving unit;

at least one processor communicatively connected to the acoustic signal receiving unit;

at least one memory communicatively coupled to the at least one processor; and a weighted finite state transducer (WFST) decoder communicatively coupled to, and operated by, the processor, and to:

propagate tokens that are each associated with a sound from a recording of a person talking and that is at least part of a word, by at least one processor, through a weighted finite state transducer (WFST) having words or word identifiers as output labels of the WFST, and comprising placing word sequences into a word lattice;

generate a word history designation for individual tokens when a word is established at an arc of the WFST with an output symbol, wherein the word history designation indicates a word sequence; and determine whether or not two or more tokens should be combined to form a single token in a state of the WFST by using, at least in part, the word history designations so that the recorded sounds are transformed into data that indicates recognition of an utterance by using, at least in part, the word history designations.

11. The system of claim 10 wherein the WFST decoder is to recombine two or more tokens in the same state of the WFST when the word history designations of the tokens are the same and avoiding a recombination when the word history designations of two or more tokens are not the same.

12. The system of claim 10 wherein the WFST decoder is to place the word established at an arc of the WFST with an output label into a word lattice as tokens are being propagated.

13. The system of claim 12 wherein the WFST decoder is to perform an exception update of the word lattice by recombining multiple tokens into a single new active token when the word history designations of the multiple tokens are different, and comprising:

placing word lattice node references of the multiple tokens into the new active token when the references are unique to other references from other ones of the multiple tokens, and maintaining the reference with the best score for the new active token when the reference is the same among more than one of the multiple tokens.

14. The system of claim 10 wherein the designation is a hash tag formed by using a recursive hash function.

15. The system of claim 10 wherein the WFST decoder is to assign a different value to individual words in a vocabulary of possible words to be used as output symbols of the WFST, and using multiple values corresponding to multiple words to determine the word history designation.

16. The system of claim 10 wherein the word history designation is different depending on the order of the words within the word sequence.

17. The system of claim 10 wherein the WFST decoder is to combine multiple final end tokens into a single utterance end token.

18. The system of claim 10 wherein the WFST decoder is to:

recombine two or more tokens in the same state of the WFST when the word history designations of the tokens are the same and avoiding a recombination when the word history designations of two or more tokens are not the same;

place the word established at an arc of the WFST with an output label into a word lattice as tokens are being propagated;

perform an exception update of the word lattice by recombining multiple tokens into a single new active token when the word history designations of the multiple tokens are different, and comprising:
  placing word lattice node references of the multiple tokens into the new active token when the references are unique to other references from other ones of the multiple tokens, and
  maintaining the reference with the best score for the new active token when the reference is the same among more than one of the multiple tokens;
assign a different value to individual words in a vocabulary of possible words to be used as output symbols of the WFST, and using multiple values corresponding to multiple words to determine the word history designation; and
combine multiple final end tokens into a single utterance end token;
wherein the designation is a hash tag formed by using a recursive hash function, and
wherein the word history designation is different depending on the order of the words within the word sequence.

19. At least one computer readable medium comprising a plurality of instructions that in response to being executed on an automatic speech recognition computing device, causes the speech recognition computing device to:
  propagate tokens, by at least one processor, that are each associated with a sound from a recording of a person talking and that is at least part of a word, through the weighted finite state transducer (WFST) having words or word identifiers as output labels of the WFST, and comprising placing word sequences into a word lattice;
  generate, by at least one processor, a word history designation for individual tokens when a word is established at a token propagating along an arc with an output symbol, wherein the word history designation indicates a word sequence; and
  determine, by at least one processor, whether or not two or more tokens should be combined to form a single token in a state of the WFST by using, at least in part, the word history designations so that the recorded sounds are transformed into data that indicates recognition of an utterance by using, at least in part, the word history designations.

20. The medium of claim 19 wherein the instructions cause the computing device to recombine two or more tokens in the same state of the WFST when the word history designations of the tokens are the same and avoiding a recombination when the word history designations of two or more tokens are not the same.

21. The medium of claim 19 wherein the instructions cause the computing device to place the word established at an arc of the WFST with an output label into a word lattice as the tokens are being propagated.

22. The medium of claim 21 wherein the instructions cause the computing device to perform an exception update of the word lattice by recombining multiple tokens into a single new active token when the word history designations of the multiple tokens are different, and comprising:
  placing word lattice node references of the multiple tokens into the new active token when the references are unique to other references from other ones of the multiple tokens, and
  maintaining the reference with the best score for the new active token when the reference is the same among more than one of the multiple tokens.

23. The system of claim 19 wherein the designation is a hash tag formed by using a recursive hash function.

24. The system of claim 19 wherein the instructions cause the computing device to assign a different value to individual words in a vocabulary of possible words to be used as output symbols of the WFST, and using multiple values corresponding to multiple words to determine the word history designation.

25. The medium of claim 19, wherein the instructions cause the computing device to recombine two or more tokens in the same state of the WFST when the word history designations of the tokens are the same and avoiding a recombination when the word history designations of two or more tokens are not the same;
  place the word established at an arc of the WFST with an output label into a word lattice as tokens are being propagated;
  perform an exception update of the word lattice by recombining multiple tokens into a single new active token when the word history designations of the multiple tokens are different, and comprising:
    placing word lattice node references of the multiple tokens into the new active token when the references are unique to other references from other ones of the multiple tokens, and
    maintaining the reference with the best score for the new active token when the reference is the same among more than one of the multiple tokens;
  assign a different value to individual words in a vocabulary of possible words to be used as output symbols of the WFST, and using multiple values corresponding to multiple words to determine the word history designation; and
  combine multiple final end tokens into a single utterance end token;
  wherein the designation is a hash tag formed by using a recursive hash function, and
  wherein the word history designation is different depending on the order of the words within the word sequence.

* * * * *